United States Patent
Canal Vila et al.

(10) Patent No.: US 9,790,917 B2
(45) Date of Patent: Oct. 17, 2017

(54) WIND TURBINE BLADE AND METHODS OF OPERATING IT

(71) Applicant: ALSTOM RENEWABLE TECHNOLOGIES, Grenoble (FR)

(72) Inventors: Marc Canal Vila, Barcelona (ES); Daniel Miguel Alfaro, Sant Cugat del Vallés (ES)

(73) Assignee: ALSTOM Renewable Technologies, Grenoble (FR)

( * ) Notice: Subject to any disclaimer, the term of this patent is extended or adjusted under 35 U.S.C. 154(b) by 264 days.

(21) Appl. No.: 14/433,329

(22) PCT Filed: Oct. 3, 2013

(86) PCT No.: PCT/EP2013/070655
§ 371 (c)(1),
(2) Date: Apr. 2, 2015

(87) PCT Pub. No.: WO2014/053611
PCT Pub. Date: Apr. 10, 2014

(65) Prior Publication Data
US 2015/0267679 A1    Sep. 24, 2015

Related U.S. Application Data

(60) Provisional application No. 61/733,789, filed on Dec. 5, 2012.

(30) Foreign Application Priority Data

Oct. 5, 2012   (EP) .................................... 12382386

(51) Int. Cl.
*F03D 1/06* (2006.01)
*F03D 7/02* (2006.01)

(52) U.S. Cl.
CPC ......... *F03D 1/0641* (2013.01); *F03D 7/0224* (2013.01); *F05B 2240/311* (2013.01); *Y02E 10/721* (2013.01); *Y02E 10/723* (2013.01)

(58) Field of Classification Search
CPC . F03D 1/0641; F03D 7/0224; F05B 2240/311
See application file for complete search history.

(56) References Cited

U.S. PATENT DOCUMENTS 1,145,013 A  *  7/1915  Gallaudet ............... B64C 3/385
                                                  244/48
4,364,708 A    12/1982  David
(Continued)

FOREIGN PATENT DOCUMENTS

WO    WO 2005/064156    7/2005
WO    WO 2009/137143    11/2009
WO    WO 2012/122262    9/2012

OTHER PUBLICATIONS

International Search Report and Written Opinion for PCT/EP2013/070655, dated Nov. 7, 2013, 11 pgs.

*Primary Examiner* — Gregory Anderson
*Assistant Examiner* — Eldon Brockman
(74) *Attorney, Agent, or Firm* — Dority & Manning, P.A.

(57) ABSTRACT

Wind turbine blade comprising a spar, a plurality of ribs rotatably mounted on said spar, and a rotating means adapted to rotate at least two consecutive ribs independently of each other. The blade can thus be operated so as to rotate at least two consecutive ribs independently of each other, although it is also possible to jointly rotate all the ribs.

15 Claims, 4 Drawing Sheets

(56) References Cited

U.S. PATENT DOCUMENTS

| | | | |
|---|---|---|---|
| 4,863,117 A | 9/1989 | Riout | |
| 5,004,189 A * | 4/1991 | Igram | B64C 3/48 244/219 |
| 5,284,419 A | 2/1994 | Lutz | |
| 5,681,014 A * | 10/1997 | Palmer | B64C 3/52 244/134 A |
| 5,794,893 A * | 8/1998 | Diller | B64C 3/48 244/130 |
| 7,883,060 B2 * | 2/2011 | Phillips | B64C 3/52 244/203 |
| 8,419,363 B2 * | 4/2013 | Madsen | F03D 1/0633 416/13 |
| 8,986,487 B2 * | 3/2015 | Stenbaek Nielsen | B29C 70/342 156/244.22 |
| 9,388,789 B2 * | 7/2016 | Hibbard | F03D 1/0675 |
| 2006/0204360 A1 * | 9/2006 | Hinz | F03D 7/0224 415/175 |
| 2007/0253824 A1 * | 11/2007 | Eyb | F03D 1/0675 416/223 R |
| 2009/0290982 A1 * | 11/2009 | Madsen | F03D 1/0633 416/61 |
| 2010/0259046 A1 * | 10/2010 | Kota | F03D 1/0641 290/44 |
| 2011/0044820 A1 * | 2/2011 | Stenbaek Nielsen | B29C 70/342 416/223 R |
| 2011/0206529 A1 | 8/2011 | Bell et al. | |
| 2012/0269643 A1 * | 10/2012 | Hibbard | F03D 1/0675 416/226 |
| 2012/0321462 A1 * | 12/2012 | McPherson | F03D 1/0675 416/1 |

* cited by examiner

WIND TURBINE BLADE AND METHODS OF OPERATING IT

The present invention is related to a wind turbine blade comprising a non-rotary spar. The invention is further related to methods of operating such a wind turbine blade.

BACKGROUND

Modern wind turbines are commonly used to supply electricity into the electrical grid. Wind turbines of this kind generally comprise a rotor with a rotor hub and a plurality of blades. The rotor is set into rotation under the influence of the wind on the blades. The rotation of the rotor shaft drives the generator rotor ("directly driven") either directly or through the use of a gearbox.

Wind turbines generally comprise a tower upon which a nacelle is mounted. A rotor comprising a hub and a plurality of blades may be rotatably mounted in said nacelle. To capture enough energy it is necessary to use large blades.

Given the important variability of the wind speed, the operation of the wind turbine is sometimes controlled by varying the angle of each blade about its axis for maintaining the wind turbine rotational speed. In this case, the blade is attached to the hub by means of a connection with a degree of rotational freedom, e.g. a bearing. This arrangement is very expensive but provides a variable pitch wind turbine, which may be necessary to significantly improve the performance of the wind turbine. 'Pitch' refers to turning the angle of attack of the blades in response to variations in the wind speed to adjust the rotation speed of the wind turbine.

At low or medium wind speeds, which yield a power below the rated power of the generator, the angle of attack can be set at its maximum, although it can be smaller to help the wind turbine to accelerate faster. Above the rated wind speed, the pitch is controlled to keep the generator power at the rated power by reducing the angle of attack of the blades; besides, in this way the various parts of the wind turbine are protected from the damage that can be inflicted upon them by such strong winds.

However, the pitch control does not allow one to achieve an adaptation to the local variable flow conditions, i.e., to the varying flow conditions along and across the whole blade. Moreover, the pitch control involves rotating the whole blade as a block around the pitch axis, which implies overcoming a high inertia, whereby the time of response may be rather long and power consuming.

It is known to divide a wind turbine blade in several longitudinal segments that can pivot with respect of each other in order to define an aerodynamically-enhanced twisted blade over a wide range of wind speeds. WO2005 064156A1 discloses "fractioning the blade into at least three segments of appropriate aerodynamic shape, each segment being divided along the span of the blade and being adapted to rotate independently of each other about an axis substantially parallel to the spanwise axis of the blade". But this arrangement implies a lack of continuity between adjacent segments, which may produce turbulence and noise.

SUMMARY

The present disclosure teaches ways of twisting a wind turbine blade that at least partially solve the problems mentioned above.

In a first aspect, the present disclosure contemplates that the wind turbine blade comprises a spar, a plurality of ribs rotatably mounted on said spar, and a rotating means adapted to rotate at least two consecutive ribs independently of each other. In this way, the blade can be twisted to adapt to local flow conditions without necessarily producing discontinuities on its surface, since the rotary parts of the blade are not segments thereof but are the ribs, and the skin that extends between two consecutive ribs may be chosen to adapt to the relative rotation between said two ribs (which, in general, need not be very large) without presenting abrupt irregularities.

There are further advantages associated with this arrangement:

the connection between the blade and the hub is much simpler and cheaper because it does not need to include a bearing to allow for the pitch of the blade, and the spar can be attached directly to the hub;

the shape of the blade (e.g., chord and/or chamber and/or twist) can be adapted to mitigate the loads or to increase the power output.

In some embodiments, the rotating means may comprise at least two independent actuators (rotary or linear) arranged to rotate said at least two consecutive ribs independently of each other, i.e., each actuator is associated to one rib.

In some embodiments, said at least two consecutive ribs are spaced along the spar and extend in a direction substantially transversal to the axis of the spar.

The spar may be tubular. A tubular element is one comprising a tube or several tubes, and a tube is a hollow cylinder. The cross-section of a cylinder is not necessarily a circle, but can be any closed plane curve.

In some embodiments, the spar (tubular or not) has a rectangular cross-section. The moment of inertia of a rectangular area is bigger in the direction of the long side of the rectangle, and this can be advantageous regarding the stiffness of the spar. But, of course, the cross-section of the spar (whether it is tubular or not) may have other shapes, like a circle, a square, an octagon, etc.

In some embodiments the spar may comprise two or more longitudinal parts, so that it can be transported and mounted more easily.

In some embodiments, the rotating means may be adapted to rotate all of the plurality of ribs independently of each other. One way to achieve this is for the rotating means to comprise as many actuators as ribs, so that each actuator may actuate upon just one rib.

Optionally, the rotating means may comprise a plurality of gears. In particular, at least one actuator may be engaged to a corresponding rib by means of a bevel gear.

In some embodiments, at least one rib may comprise a mobile flap arranged at the trailing edge region of the blade, intended to further modify the aerodynamic surface of the blade.

The blade may comprise a flexible cover supported by the spar and the ribs, so that the cover can readily adapt to the relative rotation between two consecutive ribs. The flexible cover may be installed after the spar with the ribs has been mounted upon the hub, thus reducing the torque produced on the drive train of the wind turbine due to the imbalance caused by mounting one blade at a time.

In some embodiments, the flexible cover may be fastened (for example glued) to some or all of the plurality of ribs. The flexible cover may further be formed by at least two parts; said parts may, for example, be longitudinal parts.

The blade may comprise a stiffening element arranged at the trailing edge region thereof, for example a bar tended between consecutive ribs. This is particularly interesting when the distance between ribs is big.

In some embodiments, the flexible cover may comprise a first portion corresponding to the pressure side of the blade and a second portion corresponding to the suction side of the blade, such that said first and second portions are merged at the leading edge region of the blade and are removably attached at the trailing edge region of the blade, i.e., the flexible cover may be originally divided at the trailing edge region and the two portions can be attached to each other at said trailing edge region.

Optionally, said two portions may be different parts and may also be attached to each other at the leading edge region.

In some embodiments, the flexible cover may be made from an elastomeric material.

In a second aspect, the present disclosure contemplates a method of operating such a wind turbine blade, comprising the step of rotating at least two consecutive ribs independently of each other.

The method may comprise the step of rotating all of the plurality of ribs independently of each other. Alternatively, the method may comprise the step of jointly rotating at least two consecutive ribs.

In a third aspect, the present disclosure contemplates another method of operating the wind turbine blade that comprises the step of jointly rotating all of the plurality of ribs, in which case the blade is not really twisted but pitched.

BRIEF DESCRIPTION OF THE DRAWINGS

Some particular embodiments of the present invention will be described in the following, only by way of non-limiting example, with reference to the appended drawings, in which.

DESCRIPTION OF PARTICULAR EMBODIMENTS

Figure 1:
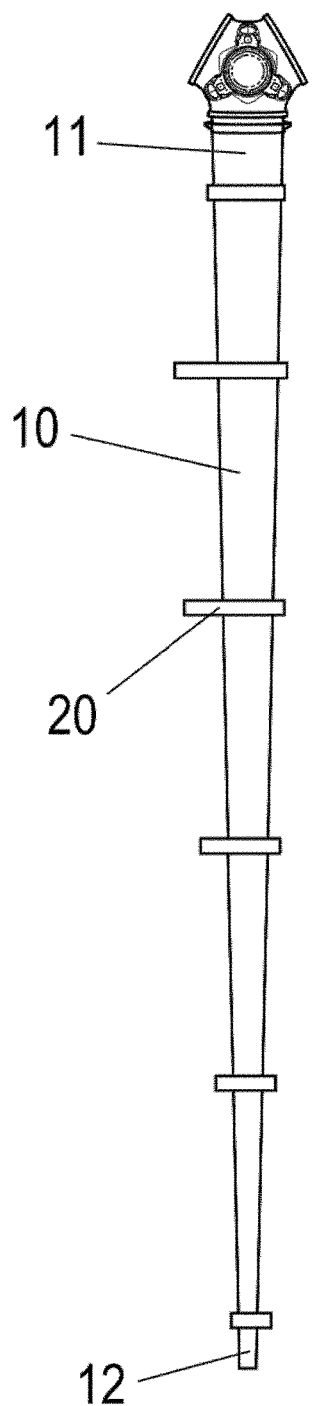
FIG. 1 is a top view of the structure of a wind turbine blade.
Figure 2:
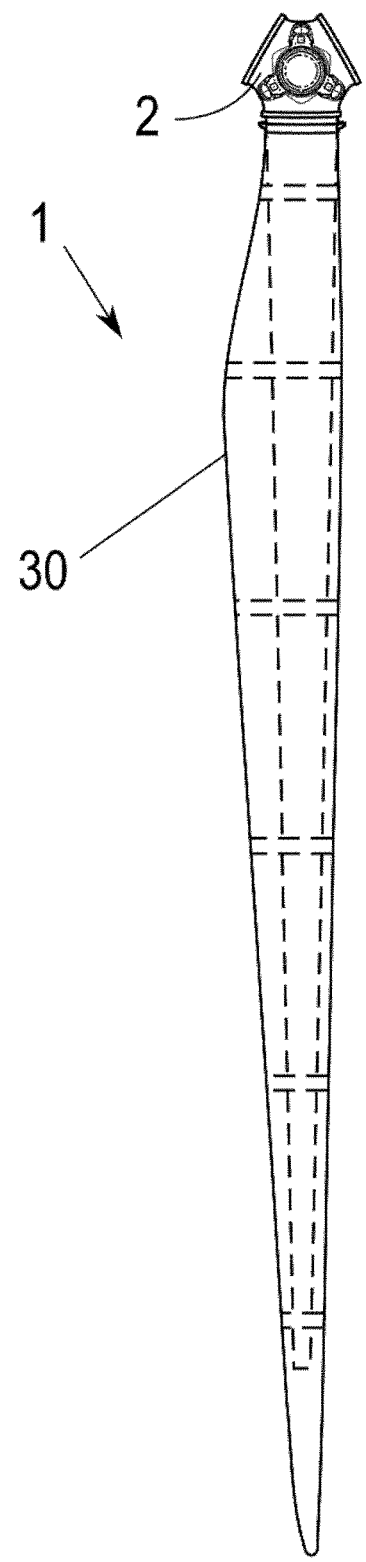
FIG. 2 is a top view of a wind turbine blade.

With reference to FIGS. 1 and 2, a blade 1 can be mounted upon the hub 2 of a wind turbine. The wind turbine blade 1 comprises a spar 10 and a plurality of ribs 20 mounted on the spar 10. The spar 10 is a tapered tube (preferably, but not necessarily, metallic) that is larger at the root 11 than at the tip 12. The spar 10 is connected to the hub 2 through the root 11. The ribs 20 are spaced along the spar 10 and extend in a direction substantially transversal to the axis of the spar. The ribs determine the general shape of the blade. The assembly of spar and ribs is covered with a flexible cover 30 that forms the surface of the blade.

Figure 3:
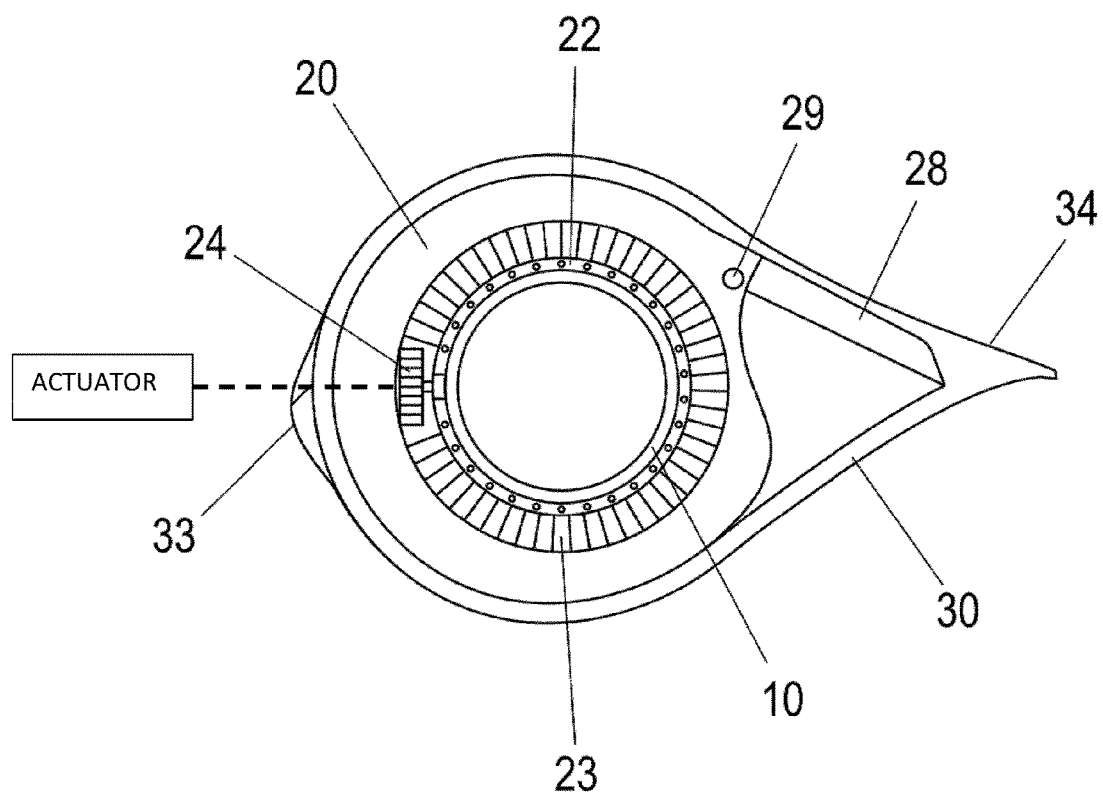
FIG. 3 is a front view of a rib of a blade.

With reference to FIG. 3, one rib 20 comprises a bearing 22 that is mounted on the spar 10, the stationary race of the bearing being attached to the spar. The rib 20 also comprises a crown wheel 23 fixed to the rotary race of the bearing 22, and a pinion 24 that engages the crown wheel 23; the crown wheel 23 and the pinion 24 may form a bevel gear. A rotary actuator (not shown in the figures) can drive the pinion 24 in order to rotate the crown wheel 23 on the bearing 22 and, consequently, the rib 20 about the spar 10. The actuator can be a motor. The actuator can also be a linear actuator. The actuators, pinions, crown wheels and bearings are included in the rotating means that can make the ribs to rotate.

The rib 20 further comprises a flap 28 hinged to the main body of the rib by means of a joint 29. The flap 28 is located at the trailing edge region 34 of the blade. The rib may comprise a piston (not shown) to move the flap; this movement allows one to vary the camber and chord of the airfoil.

Figure 4A:
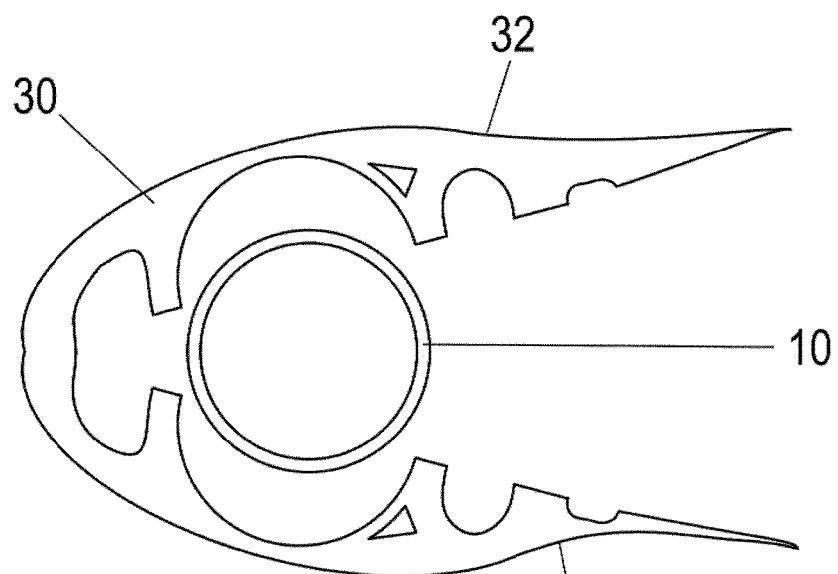
FIGS. 4A, 4B and 4C are cross-sectional views of a cover of a blade.
Figure 4B:
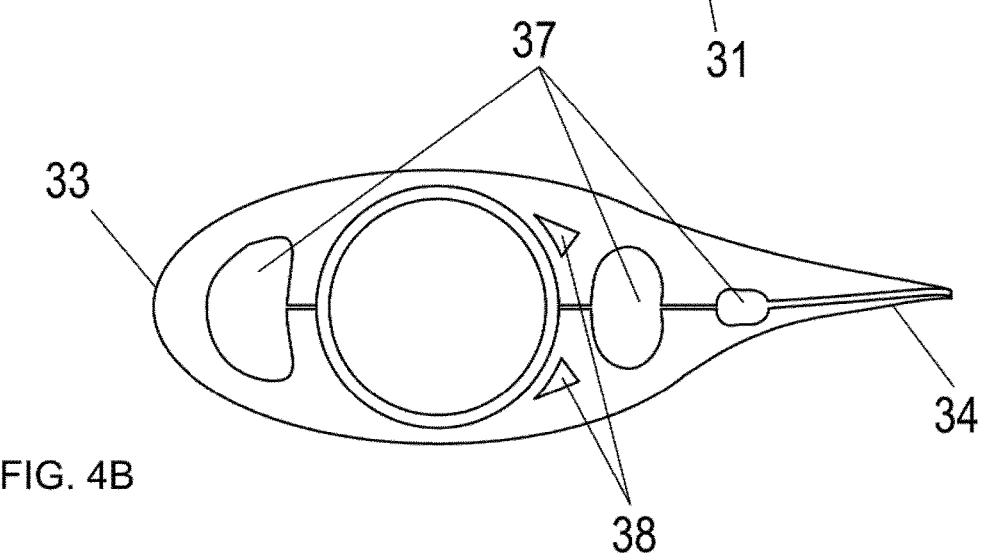
Figure 4C:
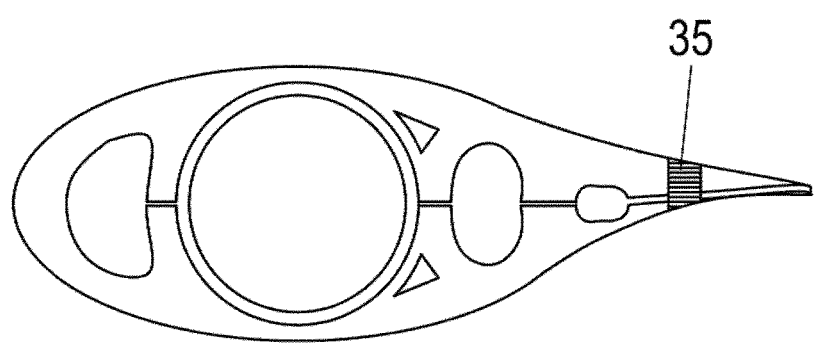

FIGS. 4A, 4B and 4C show the flexible cover 30 between ribs, that is, directly mounted on the spar 10. A lubricant can be provided between the cover and the spar, in order to facilitate the twist of the cover about the spar.

The flexible cover 30 forms the blade surface and comprises a pressure side portion 31 and a suction side portion 32. Said two portions are divided at the trailing edge region 34 of the blade but are merged at the leading edge region 33, so that the flexible cover 30 can be mounted onto the spar 10 by opening the two portions 31 and 32, sandwiching the spar 10 between said two portions and closing them onto each other, leaving the spar 10 embedded in the flexible cover 30. The two portions 31 and 32 can then be firmly attached to each other by means of a fastener 35 placed at the trailing edge region 34.

The flexible cover 30 comprises hollow regions 37 in order to be less heavy. Other hollow regions 38 can be provided to facilitate the fitting of the flexible cover 30 to the spar 10.

The portions of the flexible cover 30 that fall upon the ribs 20 are of course different (see FIG. 3), since they must adapt to the ribs instead of adapting to the spar. The flexible cover 30 may be made of one piece, plus the fastener 35, or may be composed of several parts. In the latter case, the parts of the cover can be easily replaced.

The flexible cover 30 is preferably made of an elastomeric material.

Figure 5:
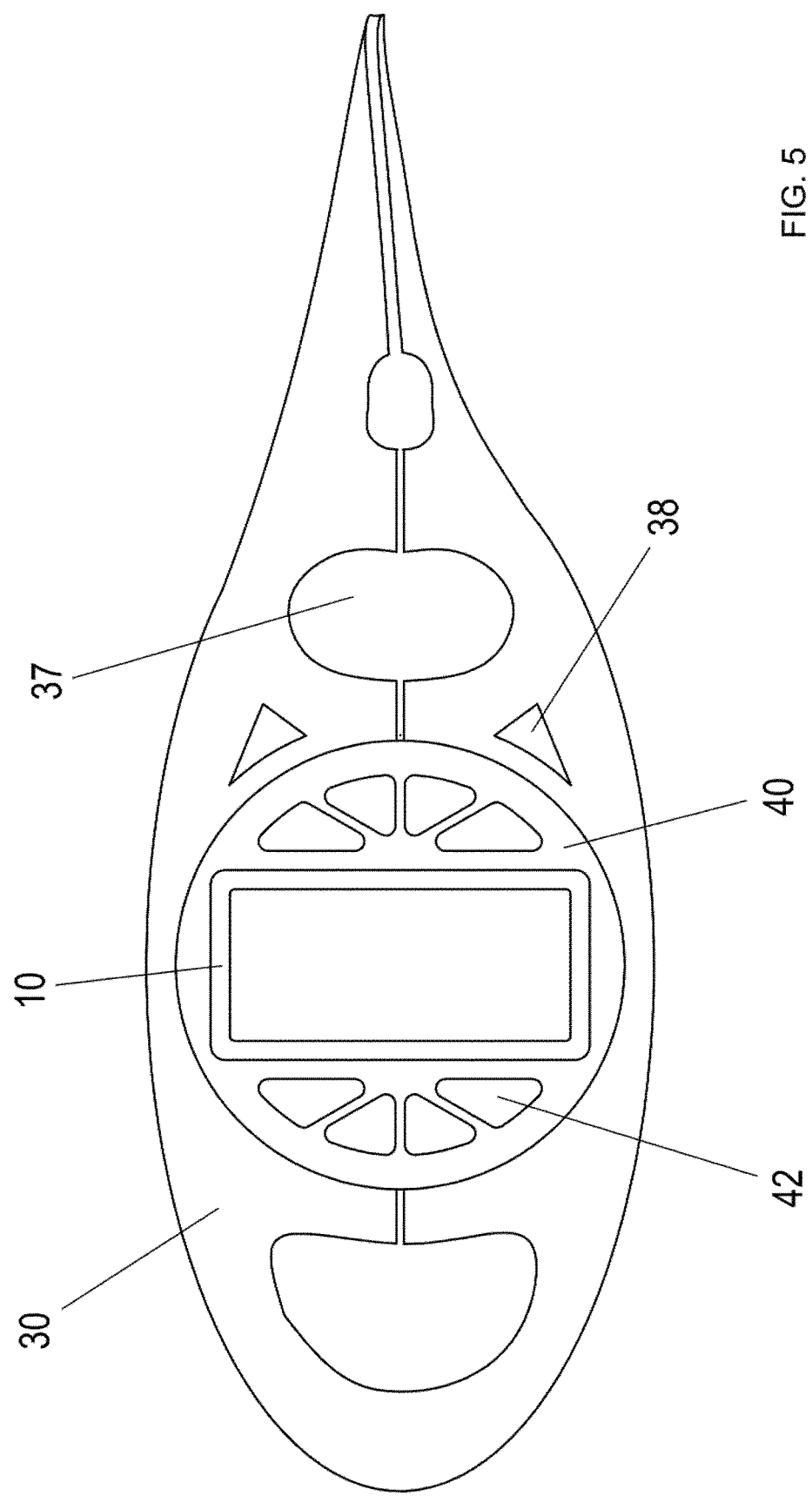
FIG. 5 is a cross-sectional view similar to that of FIG. 4B but of another blade.

FIG. 5 shows a different arrangement in which the spar 10 has a rectangular cross-section. The flexible cover 30 is similar to that of FIG. 4 but an adapter 40 is included between the spar 10 and the cover 30 (or the bearing 22 at the rib portions) to mate them and allow the cover (or the ribs) to rotate about the spar. The adapter 40 can be made of a light material, like a composite, or of a heavier material, like a metal, and can include hollow regions 42. The rectangular spar and the adapter can be tapered as well.

With these arrangements, every rotary actuator can drive every rib 20 independently of each other, so that the blade can be suitably twisted in response to the local wind conditions. The flexibility of the cover 30 ensures the smoothness of the blade surface.

Further advantages of these or similar arrangements are:
the transport of the blades is easier and cheaper because the spars can be transported together and the final installation can be made on site;
the flexibility of the cover reduces the cracks due to fatigue loads;
the main structural part is beam-like and can be manufactured more easily than a conventional blade;
the spar can be made in several parts;
the spar can be made longer than current blades.

Of course, all the ribs 30 can also be jointly rotated, in which case the blade is not twisted but pitched, i.e., the angle of attack of the blade is varied in a function similar to pitch control but in a different mode; however, the spar is not rotated about itself.

In any case, the inventive arrangements allow one to obtain the rated power at high wind speeds by acting on more variables than just the pitch angle. For example, it is possible to adapt the twist to have the same torque but with a lower thrust, thus reducing the loads for speeds higher than the rated wind speed. The outer blade sections can pitch progressively (i.e. twist) to reduce the lift, which results in an equivalent rotor with a lower working area.

The flap 28 can be moved to provide additional aerodynamic enhancement, varying camber and chord.

Although only particular embodiments of the invention have been shown and described in the present specification, the skilled man will be able to introduce modifications and substitute any technical features thereof with others that are technically equivalent, depending on the particular requirements of each case, without departing from the scope of protection defined by the appended claims.

For example, the rotating means can be any means suitable to rotate the ribs 20 about the spar 10. Or the actuators can be hydraulic or pneumatic devices.

The invention claimed is:

1. A wind turbine blade comprising:
   a spar,
   a plurality of ribs rotatably mounted on the spar,
   a flexible cover supported by the spar and the ribs, the flexible covering extending continuously over the ribs and defining a pressure side surface and a suction side surface of the blade, and
   an individual rotating means disposed at each of the ribs, the rotating means comprising an actuator for each rib, wherein each actuator independently actuates a single rib such that the cover can be continuously twisted between two or more of the ribs without a discontinuity in the cover, wherein the flexible cover comprises a first portion corresponding to the pressure side of the blade and a second portion corresponding to the suction side of the blade, such that the first and second portions are merged at a leading edge region of the blade and are removably attached to each other at a trailing edge region of the blade.

2. The wind turbine blade according to claim 1, wherein the rotating means comprises a plurality of gears.

3. The wind turbine blade according to claim 1, wherein at least one actuator is engaged to a corresponding rib by means of a bevel gear.

4. The wind turbine blade according to claim 1, wherein the spar is tubular.

5. The wind turbine blade according to claim 1, wherein the spar has a rectangular cross-section.

6. The wind turbine blade according to claim 1, wherein the spar comprises at least two longitudinal parts.

7. The wind turbine blade according to claim 1, wherein the flexible cover is fastened to at least some of the ribs.

8. The wind turbine blade according to claim 1, wherein the flexible cover comprises at least two parts.

9. The wind turbine blade according to claim 1, comprising a stiffening element arranged at a trailing edge region of the blade extending between at least two of the ribs.

10. A wind turbine comprising a blade according to claim 1.

11. A method of operating a wind turbine blade according to claim 1, comprising the step of rotating at least two consecutive ribs independently of each other.

12. The method according to claim 11, comprising the step of jointly rotating at least two consecutive ribs.

13. The wind turbine blade according to claim 4, wherein the spar has a rectangular cross-section.

14. The wind turbine blade according to claim 4, wherein the spar comprises at least two longitudinal parts.

15. The wind turbine blade according to claim 5, wherein the spar comprises at least two longitudinal parts.

* * * * *